Figure 1:
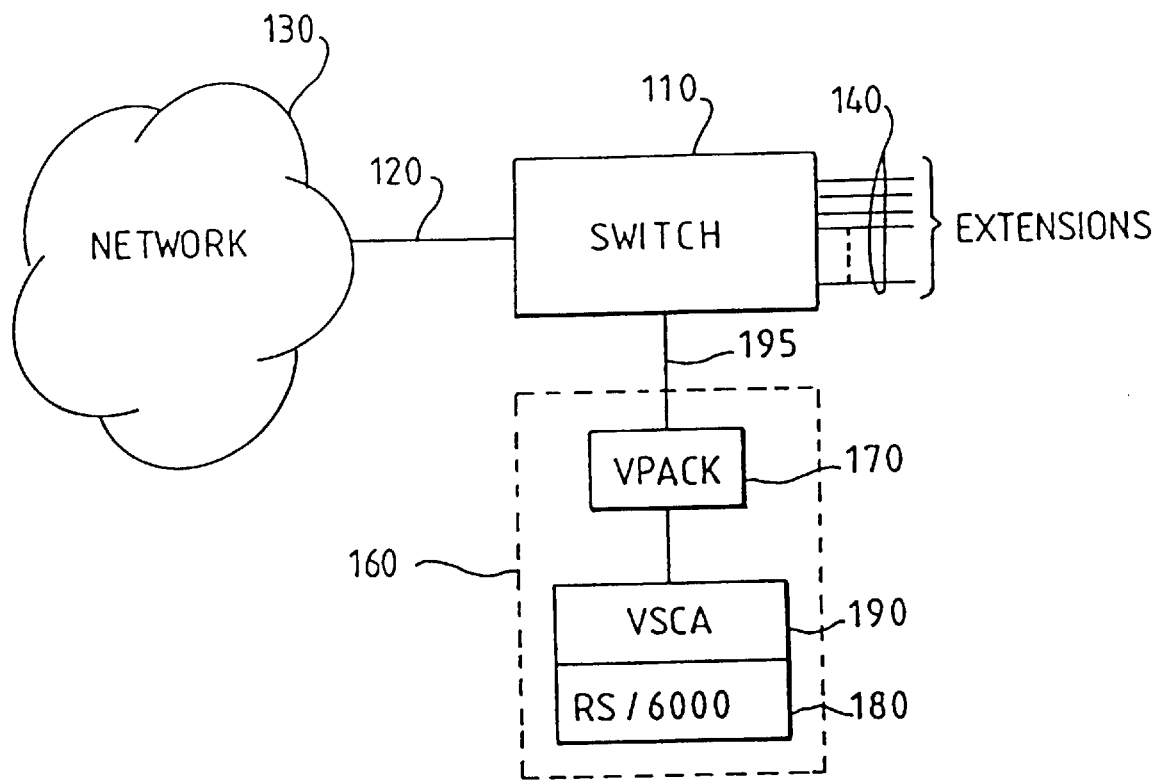

United States Patent [19]
Butler et al.

[11] Patent Number: 5,844,158
[45] Date of Patent: Dec. 1, 1998

[54] VOICE PROCESSING SYSTEM AND METHOD

[75] Inventors: Nicholas David Butler, Cupernham; Michael Cobbett; Mervyn Anthony Staton, both of Eastleigh, all of United Kingdom

[73] Assignee: International Business Machines Corporation, Armonk, N.Y.

[21] Appl. No.: 557,642

[22] Filed: Nov. 14, 1995

[30] Foreign Application Priority Data

Apr. 18, 1995 [GB] United Kingdom ................... 9507905

[51] Int. Cl.⁶ .............................. G10H 1/36; G10H 1/46
[52] U.S. Cl. ............................... 84/650; 84/634; 84/666; 84/600
[58] Field of Search .............................. 84/634, 650, 666, 84/600

[56] References Cited

U.S. PATENT DOCUMENTS

| | | |
|---|---|---|
| 5,325,423 | 6/1994 | Lewis .......................................... 379/90 |
| 5,471,527 | 11/1995 | Ho et al. .................................... 379/347 |
| 5,537,509 | 7/1996 | Swaminathan et al. ................. 395/2.37 |

*Primary Examiner*—William M. Shoop, Jr.
*Assistant Examiner*—Marlon T. Fletcher

[57] ABSTRACT

The invention relates to a voice processing system capable of outputting voice prompts and background music. The volume of background music is progressively variable relative to the voice prompts or speech. The progressive variation is effected by multiplying the background music samples by a scaling factor and then adding together a current voice sample and the scaled background music sample. Accordingly, when the combined samples are output to the user the volume of the background music varies.

11 Claims, 5 Drawing Sheets

VOICE PROCESSING SYSTEM AND METHOD

The present invention relates to a voice processing system and method.

Voice processing systems, which are well-known in the art (see for example "Voice Processing", by Walt Teschner, published by Artech House), perform a variety of functions, the most common of which is voice mail (also known as voice messaging), whereby callers who cannot reach their intended target can instead record a message for them for subsequent retrieval. Another important form of voice processing system is a voice response system (VRU), in which callers interact with the VRU, generally by means of pressing DTMF keys, in order to obtain desired information or in response to voice menus presented to the user. Other features that have been or are being incorporated into voice processing systems include voice recognition (typically so that callers can enter responses into the system without having to use DTMF keys), and text-to-speech, whereby ASCII data can be read out to a caller. It should be appreciated that there are no clear dividing lines between the different categories of voice mail system, VRU, and so on; rather the term voice processing system is used herein to broadly denote any type of system which can sit at or terminate one end of a telephone line. Voice processing systems are increasingly implemented on general purpose computers, with additional telephone interface hardware. Often an application running on the computer is specially developed by the customer (i.e., the owner of the voice processing system) to control the interaction between the caller and the voice processing system. This is particularly true for VRUs which normally need to be customized to meet the requirements of any given customer. Frequently, the development of the controlling application program represents a significant investment of time and money by the customer.

The simplest voice processing systems have as their input a conventional analog telephone line, in other words, they can plug into a socket in place of a normal telephone set. Although effective in some situations, such systems have limited call capacity (ie the number of incoming telephone lines which can be simultaneously supported is relatively low), and are restricted in the type of service that they can operate.

The more sophisticated voice processing systems have a digital trunk connection to a switch. Such voice processing systems are generally installed at the sites of customers who have a relatively large volume of incoming or outgoing telephone calls and therefore have their own switch. However, many users of voice processing systems alternatively have a PBX or lines provided by a telephony company. Thus the voice processing system makes or receives telephone calls through the switch over one or more E1 or T1 lines as appropriate.

An interaction with the user of a voice processing system, generally involves the voice processing system outputting a list of available options or commands and receiving responses thereto from the user using either speech recognition or DTMF keys. The various speech prompts capable of being output by the voice processing system are stored in voice menus as is well known within the art.

During any such interaction or between periods of apparent inaction the voice processing system can output background music to the user. Still further, as a voice application progresses, different parts of the voice application may have different respective pieces of music associated therewith. Accordingly, when a voice menu is changed as an interaction progresses, the background music may also changes. Some prior art systems do not allow a change in background music, and those that do have an almost instantaneous change in output to the user. Such an dramatic change in output may have a very disconcerting effect upon the user of the voice processing system.

Accordingly, the present invention provides a method for processing background music samples within a voice processing system connectable to a communication network, comprising the steps of providing a plurality of digital background music samples, apply digital scaling factors to the background music samples, wherein the digital scaling factors progressively vary from a first level to a second level, and outputting the scaled background music samples for transmission over the communication network.

By gradually varying the scaling factor a corresponding progressive variation in the volume of the background music is realized and the disconcerting rapid changes in volume or switches between pieces of background music are obviated. It will be appreciated that the present invention is not limited to use when fading-in or fading-out background music relative to audio or voice prompts; other audio data can alternatively be used. Still further, it could be the foreground channel which has the music while the voice prompts or other audio data are supplied by or provided on the background channel.

An embodiment provides a method further comprising the step of providing a plurality of voice samples corresponding to a voice prompt, combining the scaled background music samples and the voice samples, and wherein the combined samples are outputted for transmission over the communication network.

A voice prompt can comprise a plurality of digital speech samples which provide instructions, questions or information to the user of the voice processing system.

If background music is output concurrently with and at the same volume level as a voice prompt the audibility of the voice prompt is reduced or otherwise impaired.

Accordingly an embodiment provides a method wherein said scaling factors are progressively varied from said first level to said second level to decrease the volume of said background music when a voice prompt is about to start.

Progressively reducing the volume of the background music to relative a voice prompt or speech being output, improves the audibility of the voice prompt or speech and simultaneously avoids any disconcerting changes in relation to the background music.

After a voice prompt has been output, a sudden re-introduction of background music would again have a disconcerting effect upon the user.

Accordingly, an embodiment provides a method wherein said scaling factors are progressively varied from said second level to said first level to increase the volume of the background music at the conclusion of said voice prompt.

Completing the volume variation after the end of the voice prompt advantageously allows the transition from a very low, or non-existent, level of background music to a higher level which either partially overlaps the voice prompt or does not to overlap at all.

It will be appreciated that the channel over which speech or voice prompts are provided may not contain active speech samples at all times.

Accordingly, a further embodiment provides a method further comprising the step of preceding and succeeding said voice prompt with digital samples representing silence and wherein said step of combining is applied to the background music samples and said samples representing silence.

By providing audio samples representing silence, the same steps of scaling and combining can continue uninterrupted notwithstanding a change in the data supplied for combination.

The present invention also provides a system for processing background music samples within a voice processing system connectable to a communication network, comprising means for providing a plurality of digital background music samples, means for apply digital scaling factors to the background music samples, wherein the digital scaling factors progressively vary from a first level to a second level, and means for outputting the scaled background music samples for transmission over the communication network.

Figure 2:
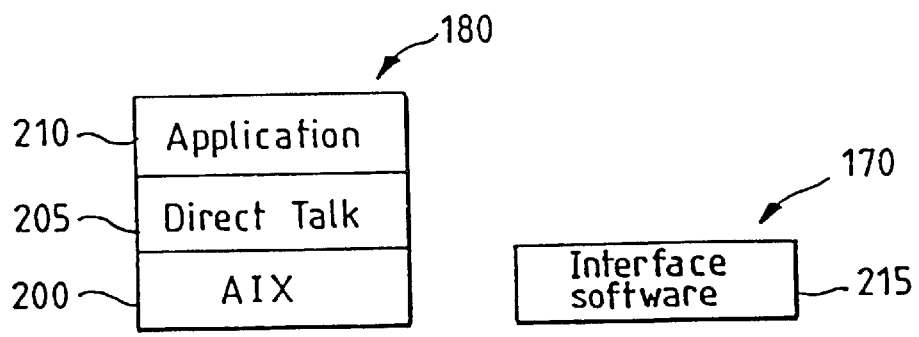
Figure 3:
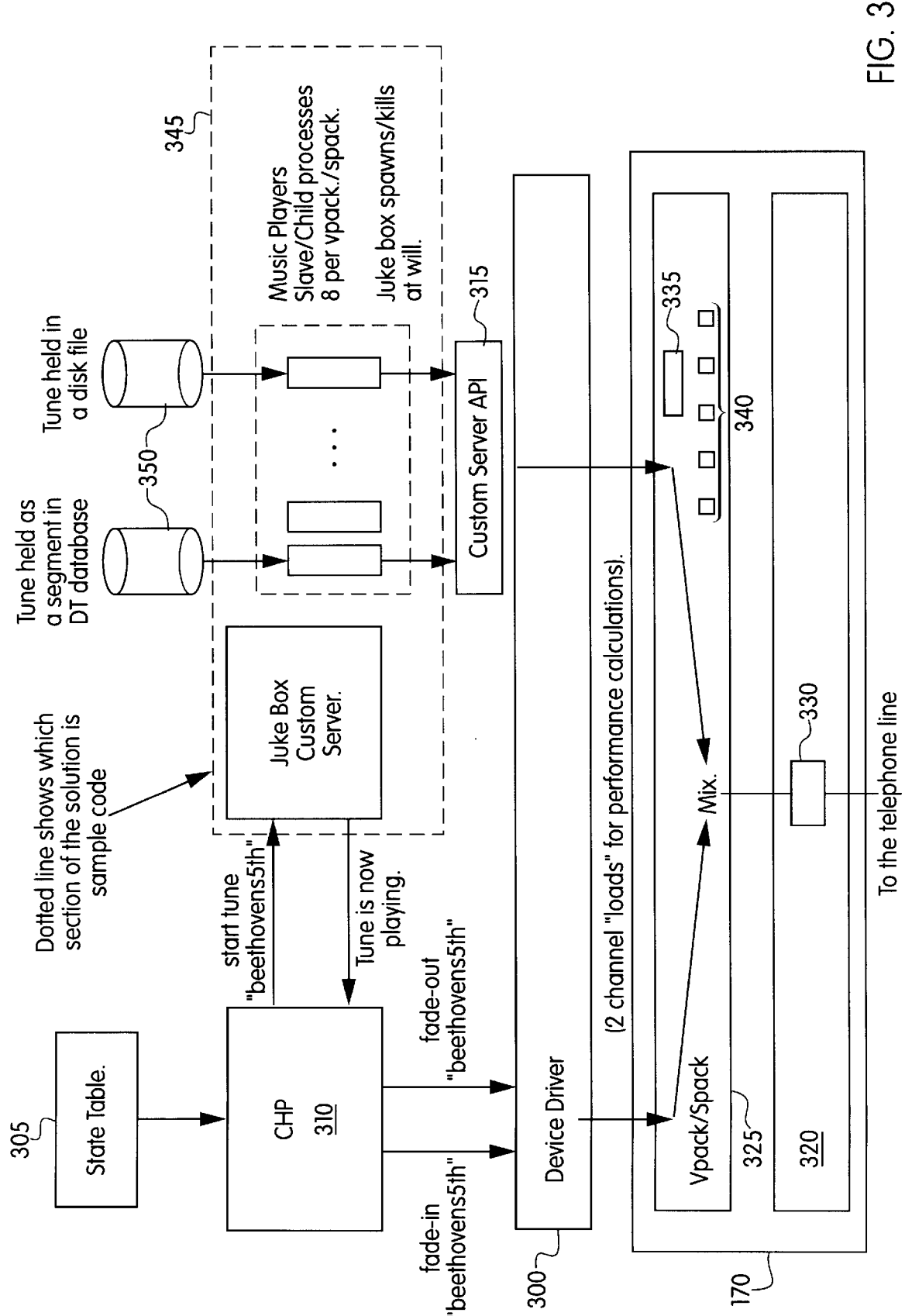
Figure 4:
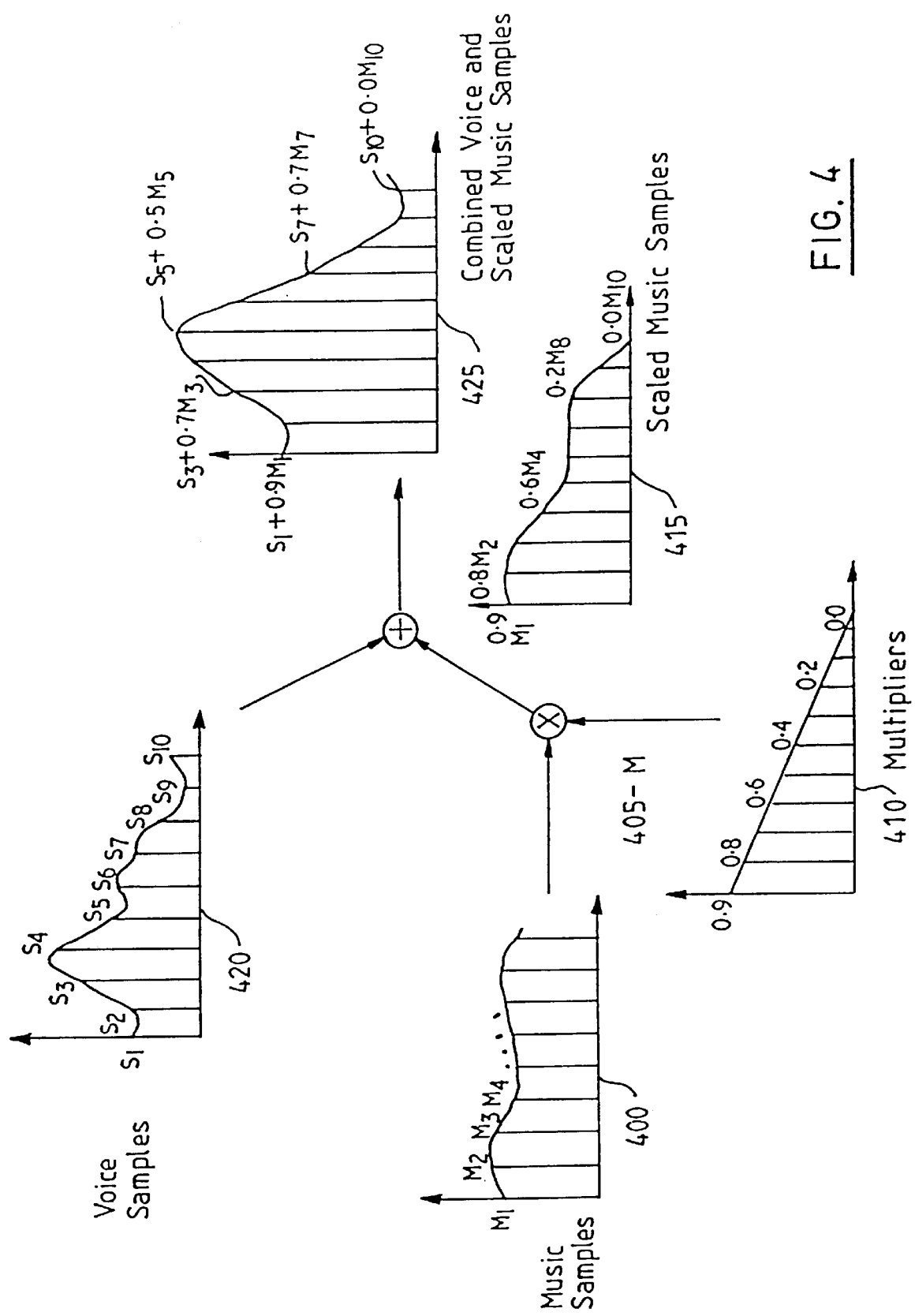
Figure 5:
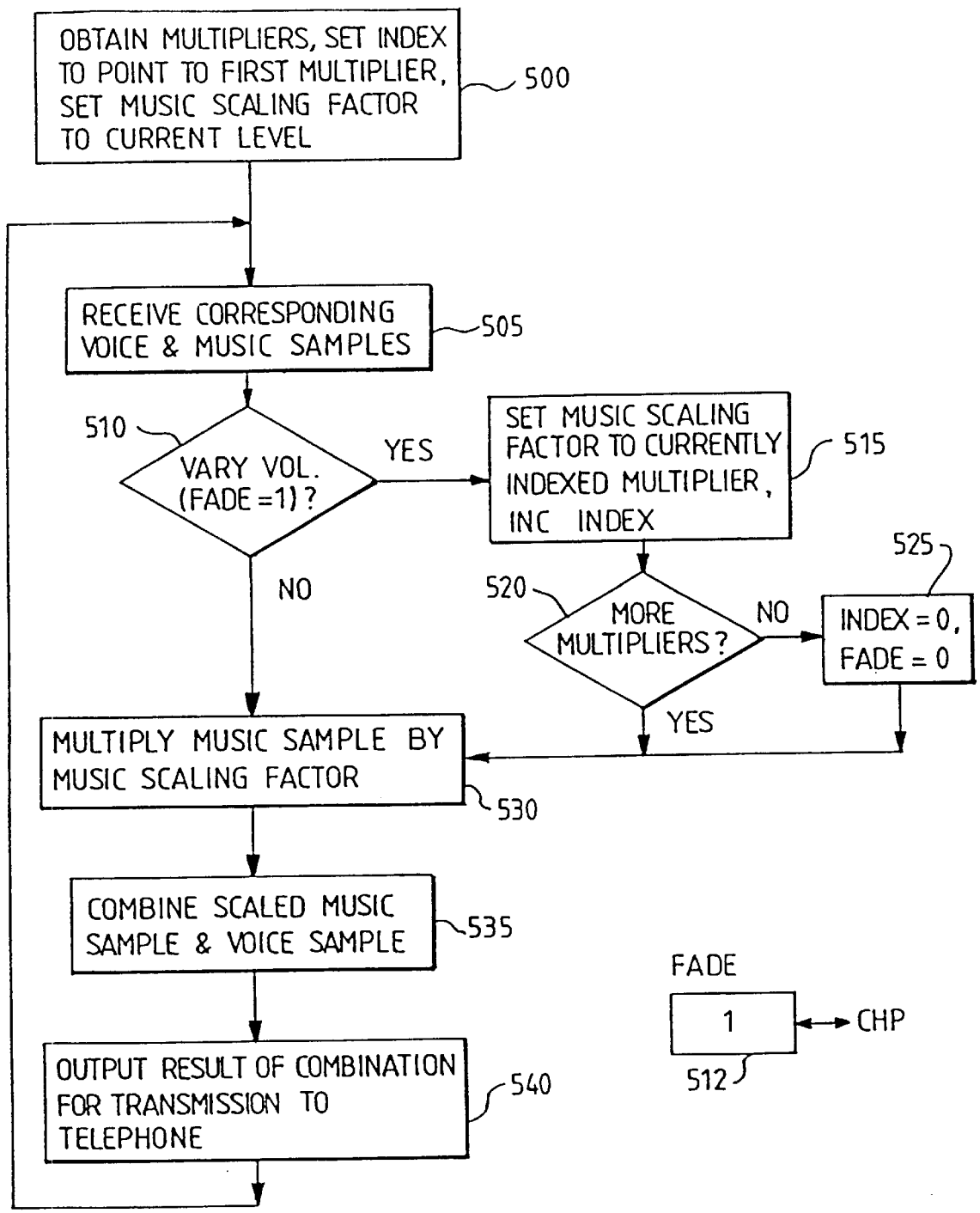

Embodiments of the invention will now be described in detail, by way of example only, with reference to the following drawings:

FIG. 1 is a simple block diagram showing a voice processing system connected to a telephone switch, FIG. 2 illustrates the main software components of the voice processing system of FIG. 1, FIG. 3 shows a more detailed diagram of the structure of the voice processing system of FIG. 1, FIG. 4 illustrates schematically the operation of an embodiment, FIG. 5 shows a flow diagram implementing an embodiment, FIGS. 6a–6e illustrate various ways in which the volume of background music can be varied with respect to voice prompts or speech.

FIG. 1 is a simple block diagram showing a switch 110 which exchanges telephony signals with the external telephone network 130 over digital trunk line 120. Attached to the switch are a plurality of conventional telephone extensions 140; these are of no direct relevance to the present invention and so will not be described further. Also attached to the switch via a digital trunk line 195 is a voice processing system 160. In the current implementation, the voice processing system is a DirectTalk/6000 system (ie runs the DirectTalk/6000 software), but the same principles apply whatever voice processing system is being used.

The DirectTalk/6000 system comprises two main hardware components, a telephone interface module 170 (also termed a digital trunk processor), and computer workstation 180, which in the case of the DirectTalk/6000 system is a RISC System/6000. Also shown is an adapter card 190, which provides an interface between the RISC System/6000 and the telephone interface module. Note that in many voice processing systems, the telephone interface module is incorporated into the adapter card for direct attachment to the computer workstation. The DirectTalk/6000 system (software plus hardware) is available from IBM Corporation, and is described more fully in IBM Callpath DirectTalk/6000 General Information and Planning (reference number GC22-0100-03) and other manuals mentioned therein, also available from IBM. As stated above, although the invention is being described with reference to the DirectTalk system, it is applicable to many other voice processing systems.

FIG. 2 is a simple block diagram of the main software components of a DirectTalk/6000 system. Running on the RISC System/6000 is first of all the operating system 200 for the workstation, which in the present case is AIX, and then the DirectTalk/6000 software 205 itself. Finally, also running on the RISC System/6000 workstation is an application 210, generally developed by the customer, which interacts with the operating system and the DirectTalk/6000 software to provide the desired telephony function. Various routines 215 also run within the telephone interface module 170. These routines are downloaded from the RISC System/6000 onto the telephone interface module when the telephone interface module is enabled, and handle items such as detection of tones, silence, and voice, and the generation of tones.

FIG. 3 is a schematic diagram of the main components of a DirectTalk/6000 system. Only those components relevant to an understanding of the present invention will be described; further details can be found in the above-mentioned manuals. The first set of components run on the RISC System/6000 workstation 180 and comprise a device driver 300 which is used to interact via the adapter card with the telephone interface module 170. A state table 305 provides the program control of applications executing in the DirectTalk/6000 system (ie in developing an application, the customer creates a set of state tables). The channel processor (CHP) 310 contains the code which performs the actions specified by the state tables 305. A custom server 315 unit allows external connections into and out of the DirectTalk/6000 system; conventionally the custom server is divided into two portions because the customer has to write some code to interact with it. The custom server is used to provide an interface to background music data stored on a storage medium 350 such as a CD-ROM or magnetic disk. The music data is stored using 16-bits per sample and produced by sampling source music at a rate of 8 kHz.

In a telephony environment, samples are generally encoded logarithmically using either A-law or mu-law standards. As a consequence of such encoding, the voice or music samples must be converted from the logarithmic encoding to a linear encoding scheme before arithmetic operations can be applied, and the results must be re-coded back to the appropriate logarithmic format before transmission over the telephone line.

The telephone interface module 170 comprises two cards, a trunk interface card (TIC) 320 and a DSP card 325. There is one DSP card and one TIC for each T1/E1 trunk connection between the switch and the voice processing system. The TIC 320 includes an ACFA chip 330, which is an industry standard chip available from Siemens, and is used to detect or insert signalling for incoming or outgoing calls respectively on trunk line 195. The DSP card 325 contains a set of six digital signal processors (DSPs), comprising one master DSP 335 and five associated slave DSPs 340. Each slave DSP processes six channels within a T1/E1 trunk, so that the set of five slave DSPs can handle all thirty channels for an E1 trunk (in the case of a T1 trunk connection one of the slave DSPs is not required).

In order to concurrently output a voice segment together with background music the following events occur. The CHP signals to a juke-box custom server that background music is required. The juke box custom server spawns a slave process executing on the RS/6000. The slave process commences loading of background music samples from the storage medium into a buffer in the device driver for processing. The CHP then supplies the voice segment to the device driver 300. The device driver 300 transfers the background music data and voice data to the master DSP 335. The device driver 300 combines the voice and background music samples for transmission over the telephone line. Optionally, the voice segment may be first processed by a single DSP, for example, decompression of a compressed voice sample.

Referring to FIG. 4, there is schematically shown the operation of the invention. Background music samples 400 are scaled using a multiplier (M) 405 selected from a set of multipliers 410. The multipliers in the set either progressively decrease or increase according to whether a corresponding decrease or increase in the volume of background music is required. The resulting scaled music samples 415 are then digitally added to the voice samples 420. The combined samples 425 are then output to the TIC for transmission over the telephone line. It can be seen that as the multipliers progressively vary a corresponding variation in the contribution of the music component to the combined samples and hence the volume level of the music as perceived by a user will also vary.

It will be appreciated that the TIC has a maximum volume which can accepted and output to the telephone line. Accordingly, the volume of the combined voice sample and scaled music sample must not exceed that maximum volume. Hence the system can be arranged such that a maximum volume is set for both the voice prompts and the scaled background music. The maximum volume need not necessarily be the same provided that the total of the maximum possible combined volumes is not greater than the maximum value which can be accepted by the TIC. Alternatively, the volume of the voice prompts and background music can be arranged such that the combined volumes of corresponding voice samples and scaled music samples always equal a constant, for example, the maximum volume of a sample which can be accepted by the TIC or some other suitable value. In the latter case as the volume of the music decreases, the volume of the voice will increase and vice-versa.

Although the multipliers are described in terms of a precalculated set an embodiment can be realized in which the multiplier values are calculated as and when required. For example, the music scaling factor may be set to 0.9 and decreased by 0.1 each time a successive pair of voice and music samples are received.

Referring to FIG. 5, there is shown a flow diagram used to implement an embodiment. A set of multipliers is received by a DSP at step 500 and an index is initialized to point to the first multiplier in the set multiplier. Step 505 receives a voice sample and a music sample from the storage medium. A check is made at step 510 to determine whether or not volume variation of the background music is required by testing the value of a variable, FADE 512. The value of the variable FADE is accessible and changeable by the CHP under control of an application. If the value of FADE is one, then volume variation is required and processing continues as follows. A music scaling factor is set to equal the currently indexed multiplier in the current set of multipliers at step 515 and then the index is arranged to point to the next multiplier. A determination is made at step 520 as to whether or not there are any remaining multipliers. If not, the index is reset to zero at step 525 and the value of FADE is set to zero thereby indicating that fading of music in accordance with the current set of multipliers or volume profile is complete.

The current music sample is then multiplied by the music scaling factor at step 530 thereby producing a scaled music sample. If the music scaling factor is greater than 1, the current music sample becomes louder. If the music scaling factor is less than 1, the current music sample becomes quieter. Step 535 adds together the current voice sample and the scaled music sample. The result of the addition is output to the trunk interface card 320 for subsequent transmission over the network at step 540. If the value of FADE is zero, then current value of the music scaling factor is not varied and the current music sample is scaled using that current music scaling factor thereby keeping the background music at a constant volume level. The above steps are repeated for each of the received voice and music samples.

For example, referring to FIG. 4, assuming that the current voice sample is $s_1$, the current music sample is $m_1$ and the currently index multiplier is 0.9. The music sample is scaled using the currently indexed multiplier to produce a scaled music sample having a value of $(0.9\ m_1)$ and the index is increased to access the following multiplier, 0.8. The current voice sample $s_1$ and scaled music sample are added together to produce a combined audio sample having a value of $(s_1+0.9\ m_1)$. The combined sample is then output for transmission to the user via the TIC 320. The next voice sample, $s_2$, and music sample, $m_2$, are received and processed accordingly. The current music sample, $m_2$, is scaled using the currently indexed scaling factor, 0.8, to produce a scaled music sample having a value $(0.8\ m_2)$. The scaled music sample and current voice sample are combined, by addition, and the result, $(s_2+0.8\ m_2)$, is output for further processing. The above is repeated for all subsequently received voice and music samples for which a variation in volume of the music samples is required.

An embodiment can be realized in which the volume level of the background music is reduced from the current level to a lower one which is not necessarily silent. The multipliers in the set may vary from one to a final value of, for example, one-half. Similarly, when the playing of a voice prompt has completed the volume level can be increase again using a set of multipliers in which the values thereof vary from one-half to one.

A further embodiment can be realized in which the volume level of the background music is reduced to a minimum during a period of user interaction with the system i.e. when a signal, voice or DTMF, is expected from the user in response to a question or command. In such a case the values of the set of multipliers may vary from one to zero. Reducing the volume level of the background music to zero during any such period obviates the possibility of background music output at the user's end from being fed-back to the voice response system and interfering with the detection of the DTMF tones or voice recognition process.

It can be seen from the above examples that the time period over which a variation in volume takes place is dependent upon the number of multipliers used to effect the variation together with the frequency of the voice or music samples (8 kHz). The duration of the time period of the variation can also vary by, for example, increasing the number of multipliers in a set or by changing the index to the next multiplier only after a predetermined number of voice and scaled music samples have been combined and output.

Although the above embodiments use multipliers which vary linearly, embodiments can be realized in which the multipliers vary other than linearly. For example, an exponential variation in volume may be desired and multipliers would have to be set or calculated accordingly.

It will be appreciated that the channel over which speech or voice prompts are provided may not contain active speech samples at all times. Hence during any periods of voice inactivity audio samples representing silence may be combined with the scaled music samples.

Figure 6A:
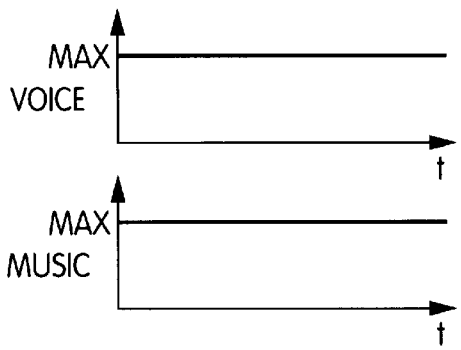
Figure 6B:
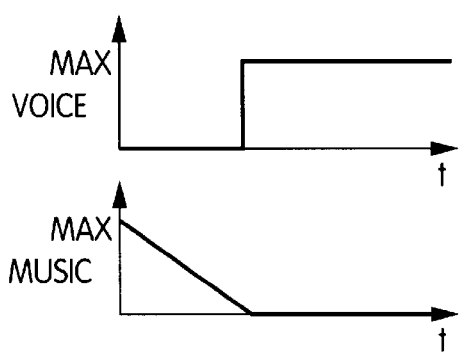
Figure 6C:
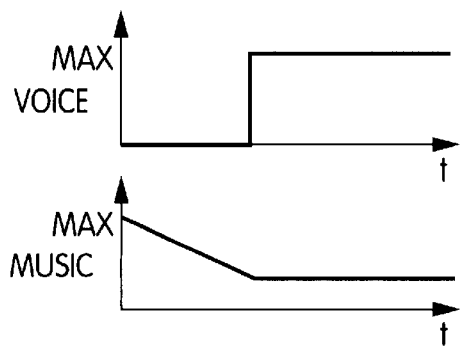
Figure 6D:
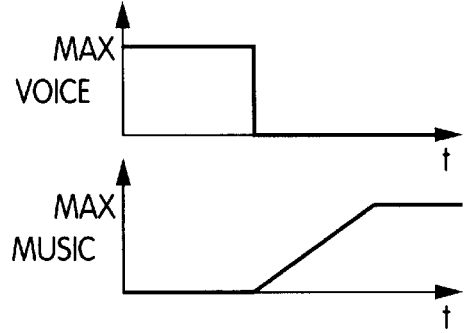

FIGS. 6*a* to 6*e* illustrate various ways in which the volume of the background music can vary with respect to the voice prompts. Referring more particularly to FIG. 6*a*, it can be seen that the volume level of both the voice prompt and the background music are constant and at a maximum. FIG. 6*b* illustrates fading-out of the background music prior to output of a voice prompt. Although the background music volume level is faded-out to zero in FIG. 6*b* it can be seen from FIG. 6c that the music can equally well be faded-out to some other value, for example one-third of the maximum. FIG. 6d shows the volume of the background music increasing after termination of the output of a voice prompt.

Figure 6E:
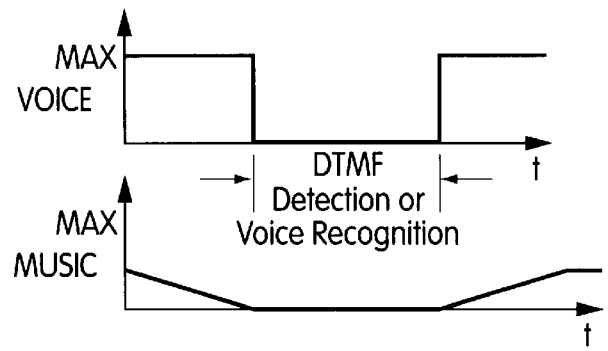

In certain instances the voice processing system may output a voice prompt to which the user is expected to respond. The user's conventionally responds using the DTMF keys or relies on any voice recognition capabilities of the system. In may cases the background music output at the user's end is unintentionally fed-back to the voice processing system via the mouth piece of the user's telephone handset. Any such feedback is undesirable as it can hamper the detection of the DTMF tones or voice recognition. FIG. 6e illustrates music volume variation during a period when a DTMF tone or voice response is expected from the user. Decreasing the volume of the background music during or prior to periods when the voice input stream is being processed, for example, for speech recognition or DTMF recognition reduces the possibility of echoes or feed-back of the background music being received by the voice processing system during such periods.

Although FIGS. 6a to 6e depict volume variations in which the variation of music and voice are separate, embodiments can be realized in which the progressive variation of music volume overlaps with the introduction or termination of speech or voice prompts.

We claim:

1. A method for processing background music samples within a voice processing system connectable to a communication network, comprising the steps of:

providing a plurality of digital background music samples, applying digital volume scaling factors to the background music samples, wherein the digital volume scaling factors progressively vary from a first level to a second level, and outputting the scaled background music samples for transmission over the communication network.

2. A method as claimed in claim 1, further comprising the steps of:

providing a plurality of voice samples corresponding to a voice prompt, combining the scaled background music samples and the voice samples, and wherein the combined samples are outputted for transmission over the communication network.

3. A method as claimed in claim 2, wherein said scaling factors are progressively varied from said first level to said second level to decrease the volume of said background music when a voice prompt is about to start.

4. A method as claimed in claim 2, wherein said scaling factors are progressively varied from said second level to said first level to increase the volume of the background music at the conclusion of said voice prompt.

5. A method as claimed in claim 2, further comprising the step of preceding and succeeding said voice prompt with digital samples representing silence and wherein said step of combining is applied to the background music samples and said samples representing silence.

6. A system for processing background music samples within a voice processing system connectable to a communication network, comprising:

means for providing a plurality of digital background music samples, means for applying digital volume scaling factors to the background music samples, wherein the digital volume scaling factors progressively vary from a first level to a second level, and means for outputting the scaled background music samples for transmission over the communication network.

7. A system as claimed in claim 6, further comprising:

means for providing a plurality of voice samples corresponding to a voice prompt, means for combining the scaled background music samples and the voice samples, and wherein the combined samples are outputted for transmission over the communication network.

8. A system as claimed in claim 7, wherein said scaling factors are progressively varied from said first level to said second level to decrease the volume of said background music when a voice prompt is about to start.

9. A system as claimed in claim 7, wherein said scaling factors are progressively varied from said second level to said first level to increase the volume of the background music when said voice prompt is finished.

10. A system as claimed in claim 7, further comprising means for preceding and succeeding said voice prompt with digital samples representing silence and wherein said means for combining is applied to the background music samples and said samples representing silence.

11. A method for processing background music samples within a voice processing system connectable to a communication network, comprising the steps of:

providing a plurality of digital background music samples, applying digital volume scaling factors to the background music samples, wherein the scaling factors progressively vary from a first level to a second level, providing a plurality of voice samples, combining the scaled background music samples and the voice samples, and outputting the scaled background music samples for transmission over the communication network.

* * * * *